March 25, 1952 G. BARSKY 2,590,146
PRODUCTION OF HYDROGEN CYANIDE
Filed March 24, 1949
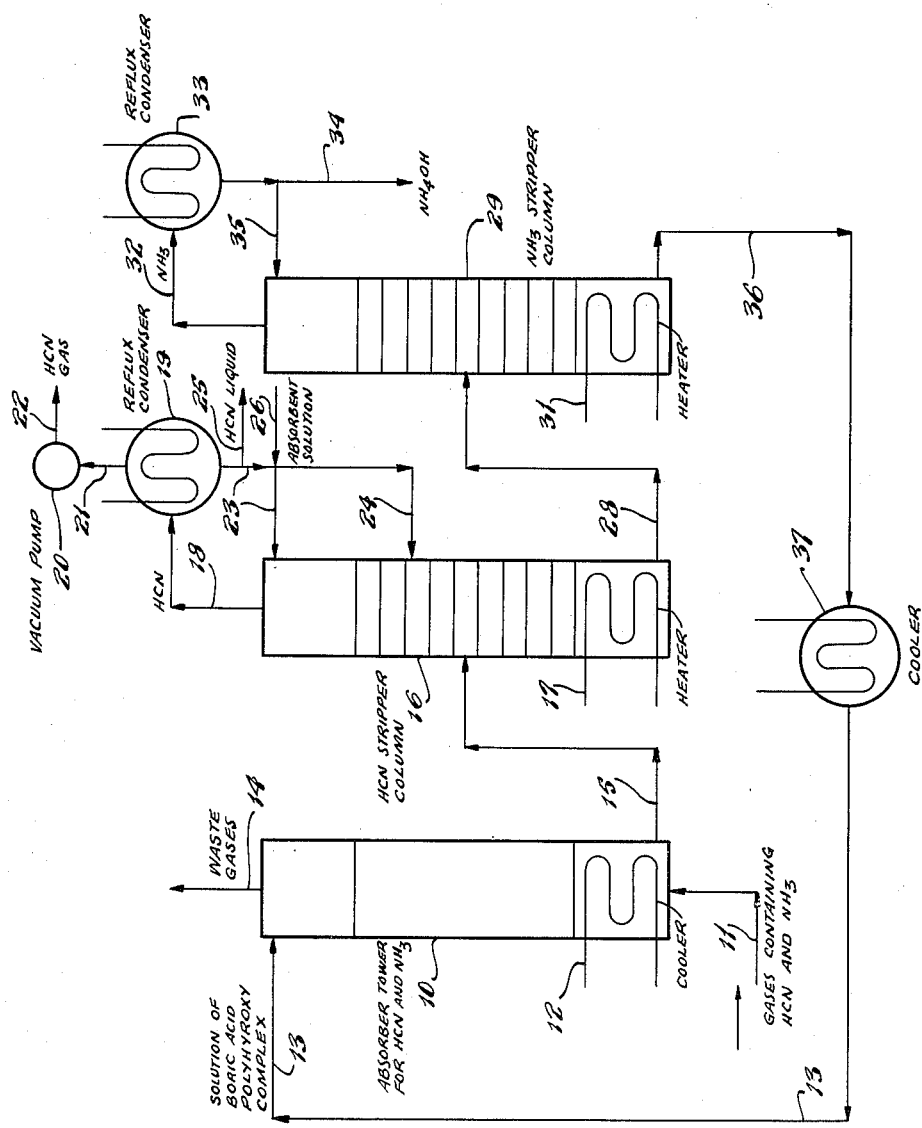
INVENTOR.
GEORGE BARSKY
BY
Hammond & Littell
ATTORNEYS Patented Mar. 25, 1952

2,590,146

UNITED STATES PATENT OFFICE 2,590,146

PRODUCTION OF HYDROGEN CYANIDE

George Barsky, New York, N. Y., assignor to Freeport Sulphur Company, New York, N. Y., a corporation of Delaware Application March 24, 1949, Serial No. 83,132

11 Claims. (Cl. 23—151)

This invention relates to the recovery of hydrogen cyanide and ammonia, primarily from reactant gaseous mixtures of the same.

Hydrogen cyanide gas is obtained in dilute gaseous mixtures from a number of processes involving reactions of ammonia or other nitrogenous gas with a hydrocarbon such as methane, either in the presence or absence of oxygen, or involving the reaction of ammonia with carbon monoxide. None of these reactions can be caused to go entirely to completion and consequently when ammonia is used an appreciable quantity of unreacted ammonia remains in the product gas mixture with the hydrogen cyanide produced. These reactions are carried out at very high temperatures of 600° C. or above, either in the presence or absence of a metal catalyst, and as a consequence, the product reaction gases invariably contain a number of gases in addition to hydrogen cyanide and ammonia. In particular, the gases contain hydrogen and nitrogen and sometimes also water vapor, carbon dioxide, carbon monoxide and various other gases. A typical analysis of a gas produced by the reaction of methane, ammonia and air with a platinum-iridium screen catalyst is as follows, the percentages being given by volume:

|                  | Percent |
|------------------|---------|
| Hydrogen cyanide | 6.0     |
| Ammonia          | 2.0     |
| Carbon dioxide   | 0.2     |
| Carbon monoxide  | 4.4     |
| Hydrogen         | 7.5     |
| Methane          | 0.5     |
| Oxygen           | 0.1     |
| Nitrogen         | 56.3    |
| Water vapor      | 23.0    |

Although the process of the present invention is particularly adapted for the recovery of hydrogen cyanide and ammonia from gas mixtures of the above type, it is also applicable to mixtures of the two gases in other and different compositions produced by other reactions.

In accordance with prior practices, hydrogen cyanide and ammonia in gaseous admixtures have been separated by a procedure involving either: (1) a treatment with an alkali to form an alkali cyanide, followed by recovery of ammonia from the gas using water or some other suitable solvent; or (2) treatment with an acid to convert the ammonia to an ammonia salt, followed by the recovery of hydrogen cyanide using water or some other suitable solvent. The first of these procedures has the disadvantage that hydrogen cyanide is not recovered as such and to convert the salt to hydrogen cyanide a treatment with acid must be employed. The cost of this acid is disadvantageous. In the second process the ammonia is not recovered in a form in which it can be reused in the process, but is recovered as an ammonia salt which must either be discarded or equipment installed to recover this ammonia salt in a commercial form or convert it back to ammonia.

An object of the present invention is to recover the hydrogen cyanide as such and also the ammonia from the above specifically described gas mixtures by an economical procedure in which the reagents used are easily recoverable and in which the ammonia may be collected in a condition suitable for recycling in the hydrogen cyanide production process.

In its preferred adaptation, the process of the present invention may be considered to involve recovering hydrogen cyanide and ammonia separately from gaseous mixtures of the same by intimately contacting the said mixture with a boric acid-polyhydroxy complex in aqueous solution in such manner as to cause the ammonia to react with the complex and the cyanide to become dissolved in the solution, after which the cyanide is vaporized from the resulting solution at a temperature below that at which the reaction product dissociates, the remaining liquid being thereafter heated at a temperature which dissociates the reaction product and yields the ammonia.

The hydrogen cyanide is collected in a substantially pure condition and may be used for conventional purposes without further treatment. The ammonia is obtained in a condition, after concentration if desired, suitable for any purpose, as for reaction with methane or carbon monoxide for the production of additional hydrogen cyanide. The boric acid-polyhydroxy complex may be substantially completely recovered, or wholly recovered, depending upon the particular polyhydroxy component used in initially producing the complex.

The boric acid-polyhydroxy complex used in the present process may be produced by merely mixing an aqueous boric acid solution with an organic compound containing more than one hydroxyl group in the molecule, such procedure being conventional. These complexes have the properties of strong acids at room temperatures and at somewhat higher temperatures, but when they are heated to boiling at atmospheric pressure, the complex dissociates into the original components. When an aqueous solution of the complex is contacted with hydrogen cyanide reaction gases and ammonia under cool conditions, it both dissolves and stabilizes the hydrogen cyanide, and reacts with the ammonia to form a complex salt. The solution is of such acidity that ammonium cyanide is not formed.

Boric acid-polyhydroxy complexes of the nature contemplated by the present invention are described in many published articles. Of the earlier articles there may be mentioned:

1. J. Boeseken et al., Rec. trav. chim. 30, 392–406, Chem. Abstracts 6, 623. The conductivity (due to acidity) of boric acid is described as being increased by reaction with glycerol, pentaerythritol, pyrocatechal, and pyrogallol.

2. J. Boeseken et al., Rec. trav. chim. 34, 96–113, Chem. Abstracts 9, 1766. Conductivity increases are reported for reaction products with erythritol, mannitol, dulcitol, sorbitol, and $CNO_2(CH_2OH)_3$.

3. J. Boeseken, Rec. trav. chim. 40, 553–67, Chem. Abstracts 16, 906. Conductivity increases by a number of compounds are described and here it is stated that the mutual increase in the electrical conductivity by mixing polyalcohols, polyphenols, HO acids, ketonic acids, etc., with $H_3BO_3$ is due to the formation of complex acids stronger than the components.

The complexes preferred in the operation of the process of the instant invention are the boric acid-pentaerythritol complex and the boric acid-glycerol complex.

In recovering the hydrogen cyanide and the ammonia from the pregnant solution, advantage is taken of the fact that the ammonia is combined chemically and the solution has a relatively low ammonia vapor pressure, while the hydrogen cyanide being merely dissolved possesses a relatively higher vapor pressure, i. e. approximately the same as the hydrogen cyanide vapor pressure of water solutions of the same concentration. In view of this difference in vapor pressure a mere heating of the pregnant solution will separate most of the hydrogen cyanide before any decomposition of the complex and liberation of ammonia occurs.

In accordance with a preferred embodiment of the invention with respect to the treatment of the pregnant solution, the recovery is assisted by reducing the vapor pressure on the solution by applying a vacuum to the same. Through this procedure, substantially all of the hydrogen cyanide can be removed from the solution and substantially all of the ammonia retained in it.

In accordance with a still further limited embodiment, the foregoing reduction of pressure to remove hydrogen cyanide is accompanied by an increase in temperature. The vapor pressure can be increased satisfactorily up to, but not above that which effects the boiling of the solution at atmospheric pressure. Within this limitation, the temperature and reduced pressure can be adjusted so that the solution will boil. Accordingly, advantage can be taken of a relatively low temperature boiling action of the solution to remove the hydrogen cyanide more effectively and efficiently.

After the hydrogen cyanide is stripped from the solution, the ammonia can then be removed by heating the solution to a somewhat higher temperature at which the ammonia-boric acid-polyhydroxy compound dissociates thereby liberating the ammonia. This dissociation may be most satisfactorily accomplished by heating the solution to its boiling point at atmospheric pressure.

When hydrogen cyanide gases are produced by the hereinbefore described reaction of hydrocarbons and nitrogenous gases, the potential yield is ordinarily diminished by such steps as retaining the gases at high temperatures over too long a period or collecting the gases in such manner as to expose them to solution in liquids in which hydrogen cyanide is unstable. The present process of recovering hydrogen cyanide gases and ammonia is particularly adapted for utilizing the reaction gases in such manner as to avoid any loss of potential yield of cyanide. The hot cyanide gases immediately after their production are cooled rapidly to a temperature below 400° C. by contacting the same with cooling surfaces maintained at a temperature below 400° C. but above the dew point of the gas mixture. The cooling step carried out in this manner does not permit the hydrogen cyanide to come in contact under non-stabilizing conditions with any condensed hydrogen cyanide or water which forms on cooling surfaces of very cold conventional heat exchangers. This procedure for avoiding dissolution and decomposition of some of the hydrogen cyanide in the reactant gases is covered in the copending application of Gordon A. Cain and Benjamin F. Frederick, Jr., Serial Number 86,608 filed April 9, 1949.

The apparatus for carrying out the process of the present invention is adapted for but not limited to the treatment of the above described mixed gases containing hydrogen cyanide and ammonia cooled to a temperature below the described 400° C.

The accompanying drawing illustrates diagrammatically an apparatus in which the process of the present invention may be carried out effectively. With reference to the elevational drawing, there are illustrated three towers which may be of standard construction, as packed towers, plate towers, bubble cap towers or other gas-liquid contact apparatus. The first is an absorber tower 10 preferably having a packing therein for obtaining intimate contact between the introduced gases and the liquid absorbent. At the bottom of the tower, an inlet 11 is provided for introducing the gases containing hydrogen cyanide and ammonia. A cooler 12 is mounted in the bottom of the column. The top of the column is provided with an inlet 13 for introducing the absorbing liquid and an outlet 14 for the waste gases. Substantially at the bottom of the column there is an outlet conduit 15 for the liquid absorbent containing the absorbed gases. This conduit is provided with a suitable seal, not shown, and leads to a midpoint in the hydrogen cyanide stripper column 16. The bottom of this column is provided with a heater 17 composed suitably of a steam heating coil. The top of this column 16 is provided with an outlet conduit 18 for the hydrogen cyanide gases and connects with the reflux condenser 19. This condenser in turn is connected with an optional vacuum pump 20 through conduit 21. The vacuum pump 20 is provided with an outlet 22 for the hydrogen cyanide gases. The bottom of the reflux condenser 19 is connected to a point near the top of the column 16 by a conduit 23 and to a midpoint through a conduit 24. A conduit 25 for withdrawing the condensate is connected to the conduit 23. A conduit 26 connected to the conduit 24 is provided for the introduction of fresh absorbent solution.

At the bottom of the column 16, an outlet conduit 28 is connected for the transfer of the liquid to the ammonia stripper column 29, the connection being at the side thereof. The bottom of this column is provided with a heater 31 of any suitable construction. At the top of this column 29, there is an outlet conduit 32 for ammonia gases, connected to a reflux condenser 33. To the bottom of this condenser there is connected an outlet 34 for ammonium hydroxide. A branch conduit 35 is provided for reintroducing a portion of the ammonium hydroxide back into the column 29.

At the bottom of the column 29 an outlet conduit 36 is provided for taking off the absorbing liquid. This conduit is connected to a cooler 37 which in turn is connected through the conduit 13 leading to the top of the absorber tower 10, thus accomplishing the recycling of the absorber liquid.

In the preferred operation of the process of the invention, the reactant gas mixture containing hydrogen cyanide and ammonia cooled to some temperature below 400° C., preferably by the procedure hereinbefore described, is introduced through the conduit 11 into the absorber tower 10 where it then comes in contact with the cooler 12. The gases are here preferably cooled to a temperature as low as room temperature, for by such reduction, the absorbent capacity of the liquid used in the tower is substantially increased.

The cooled gases leaving the cooling coil or other device 12 flow upwardly through the tower in contact with an aqueous solution of the boric acid-polyhydroxy complex flowing downwardly through the tower. In this tower the quantity of the absorbent liquid is correlated with the amount of the hydrogen cyanide and ammonia in the gases introduced into the tower such that all of the desirable gases are absorbed. The waste gases, substantially free of the hydrogen cyanide and ammonia, then pass out through the top of the tower 10.

The absorbing liquid after passing through the main part of the tower flows over the cooling coil 12 and hence the hydrogen cyanide gases coming into the tower are prevented from being decomposed by coming in contact with condensate which otherwise would form on the cold surface of the cooling coil.

The absorbent liquid containing the hydrogen cyanide and ammonia flows through the conduit 15 to the hydrogen cyanide stripper column 16. The said liquid flows downwardly through part of the tower countercurrent to components of the solution which are continuously being vaporized by the heat of the heating coil 17 or other heating device. Through this contact, there is a continuous condensation of part of the vapor in the solution and a re-evaporation of an equivalent quantity of vapor from the solution. Since the concentration of hydrogen cyanide in the vapor from the boiling solution is higher than the concentration of hydrogen cyanide in the liquid from which the vapor came, this continuous evaporation, condensation and re-evaporation as the vapor goes up the column leads to an increase in the hydrogen cyanide concentration in the vapor and a decreasing hydrogen cyanide concentration in the liquid. Conversely, the ammonia concentration in the vapor is less than the ammonia concentration in the liquid and hence the ammonia is carried downwardly in the column with the liquid. The section of the column below the plate on to which the solution is initially fed is sufficiently tall that an adequately large portion of the solution is vaporized by the heater 17 to cause substantially all of the hydrogen cyanide to be stripped from the solution and substantially all of the ammonia to be retained in it. In the column 16 the solution is heated to a temperature which causes all or substantially all of the hydrogen cyanide to be vaporized. When this is accomplished, the vapors rising from the said section will be composed largely of hydrogen cyanide and water vapor together with only small amounts of ammonia.

Since the boric acid-polyhydroxy complex is not volatile, provision must be made to prevent ammonia and hydrogen cyanide from contacting each other in the tower under conditions which will form ammonium cyanide. For this reason, a small amount of fresh absorbent solution is introduced into the conduit 26 which flows in turn through the conduits 23 and 24 into the top of this column 16. This fresh absorbent solution reacts with the ammonia and carries it to the bottom of the column.

Since the separation of the hydrogen cyanide from the ammonia is more effectively accomplished by boiling at temperatures below atmospheric, the column 16 is preferably operated at a reduced pressure. The pressure is reduced by means of the condensation in the condenser 19 or by the vacuum pump 20 connected through the reflux condenser to the top of the tower 16. The hydrogen cyanide gases may flow through the reflux condenser, the vacuum pump and to the outlet conduit 22 where they are utilized in any suitable manner. Alternatively, the reflux condenser may be operated at a sufficiently low temperature to cause partial or complete condensation of the hydrogen cyanide, and in this case, liquid hydrogen cyanide flows from the bottom of the condenser 19 and is discharged from the apparatus by flowing through the conduit 23 and out through conduit 25.

The solution flowing to the bottom of the hydrogen cyanide stripping column 16 containing substantially all of the ammonia and substantially none of the hydrogen cyanide flows through the conduit 28 into a midpoint of the ammonia stripper column 29. In this column the absorbent solution is preferably heated to boiling under atmospheric pressure whereby the boric acid-polyhydroxy complex ammonium salt dissociates, the ammonia being vaporized. The heater 31 serves to accomplish this increase in temperature and the ammonia is stripped from the solution within the lower part of the column. In the upper part of the column, the ammonia is separated from any desired proportion of the water. This dual function of the column is accomplished by constructing the column at the proper height in accordance with conventional calculations. By control of the reflux rates, any desired concentration of ammonia and water can be taken off at the top of the column. The condenser 33 is operated in conventional manner to bring about the required reflux rate.

The ammonium hydroxide discharged from the reflux condenser may be further concentrated or anhydrous ammonia may be produced by passing the ammonium hydroxide through an additional rectifying column (not shown). Concentrated ammonia obtainable in this manner may be recycled in the over all process and used with additional hydrocarbon or carbon monoxide to produce additional hydrogen cyanide.

The dissociated boric acid-polyhydroxy complex produced in the column 29 upon cooling reforms the complex and after being reduced in temperature in the cooler 37, may be reused for absorbing additional hydrogen cyanide and ammonia in the tower 10.

The apparatus illustrated in the drawing is provided with all required liquid pumps, seals and valves, and may also be provided with heat exchangers in various places for conserving heat. The design and dimensions of all the equipment may be determined by engineering and economic considerations and are not part of the present invention.

Specific example

A reactant gas in a quantity of 100 pounds, composed approximately of 6.6 pounds HCN, 1.4 pounds $NH_3$, 21.5 pounds $H_2O$ and 70.5 pounds inert gas was introduced at a temperature of 90° C. into the absorber 10 wherein it was brought in contact with 500 pounds of an obsorber solution composed of 2.50% of boric acid and 8.3% technical pentaerythritol in reacted condition with 0.05% ammonia, the remainder being water, and the solution introduced into the tower being at a temperature of 25° C.

The solution of the hydrogen cyanide and ammonia formed in the column amounting to 528 pounds flowed therefrom at a temperature of 35° C. This solution on test showed 6.52 pounds HCN, 1.43 pounds $NH_3$, 12.50 pounds boric acid and 41.50 pounds of technical pentaerythritol. This solution introduced into the HCN stripper column 16 became heated to a temperature of 90° C. in the bottom thereof and 83° C. in the plate adjacent the said inlet. The column was maintained at a pressure of 20 inches Hg absolute.

One hundred and fifty pounds of fresh absorbing solution were introduced into the top of this column 16. From the top of this column 6.45 pounds of HCN were collected and from the bottom 673 pounds of solution were withdrawn containing 1.40 pounds of $NH_3$ and a little of the HCN.

This solution was then introduced into the side of the ammonia stripping column 29. From the top of this column $NH_3$ and water passed to the reflux condenser 33. From this condenser 1.35 pounds of $NH_3$ and 21.50 pounds of water were collected. At the bottom of the column 29, there were withdrawn 650 pounds of the absorbent solution containing only a trace of $NH_3$.

It should be understood that the present invention is not limited to the specific material, procedures and structures herein described, but that it extends to all equivalents which will occur to those skilled in the art upon consideration of the scope of the claims appended hereto.

I claim:

1. A process for recovering hydrogen cyanide from reactant gas mixtures containing the same which comprises intimately contacting the mixture with an aqueous solution of an acidic boric acid-polyhydroxy organic complex thereby dissolving and stabilizing the same and then vaporizing off the cyanide from the resulting solution.

2. A process for recovering hydrogen cyanide from gaseous mixtures containing the same which comprises passing the gaseous mixture countercurrent to and in intimate contact with a flowing mass of an aqueous solution of an acidic boric acid-polyhydroxy organic complex, whereby the hydrogen cyanide becomes dissolved and is stabilized in the solution, and then stripping off the cyanide from the resulting solution by heating the same.

3. A process for recovering hydrogen cyanide from gaseous mixtures of hydrogen cyanide and ammonia which comprises contacting said mixture with an acidic aqueous solution of a boric acid-polyhydroxy alcohol complex, thereby dissolving the same and then stripping off the cyanide from the resulting solution by heating the same to boiling under reduced pressure.

4. A process for recovering hydrogen cyanide from gaseous mixtures of hydrogen cyanide and ammonia which comprises dissolving the hydrogen cyanide of the mixture in an acidic aqueous solution of a boric acid-polyhydroxy alcohol complex and then stripping off the cyanide from the resulting solution at a temperature below that at which ammonia is liberated.

5. A process for recovering separately hydrogen cyanide and ammonia from gaseous mixtures of the same which comprises intimately contacting the said mixture with an acidic aqueous solution of a boric acid-polyhydroxy alcohol complex whereby the ammonia reacts therewith and the cyanide is dissolved in the solution, stripping off the cyanide from the resulting solution at a temperature below that at which the ammonia reaction product dissociates, and then heating the remaining liquid to a temperature which dissociates the reaction product yielding the ammonia.

6. A process for recovering separately hydrogen cyanide and ammonia from gaseous mixture of the same which comprises passing the said mixture in intimate contact with an acidic aqueous solution of a boric acid-polyhydroxy alcohol complex whereby the ammonia reacts therewith and the cyanide is dissolved in the solution, stripping off the cyanide from the resulting solution under reduced pressure and at a temperature below that at which the ammonia reaction product dissociates, and then heating the remaining liquid to a temperature which dissociates the reaction product yielding the ammonia.

7. A process for recovering separately hydrogen cyanide and ammonia from gaseous mixtures of the same which comprises intimately contacting the said mixture with an acidic aqueous solution of a boric acid-glycerol complex, whereby the ammonia reacts therewith and the cyanide is dissolved therein, stripping off the cyanide from the resulting solution at a temperature below that at which the ammonia reaction product dissociates and then heating the remaining liquid to a temperature which dissociates the reaction product yielding the ammonia.

8. A process for recovering separately hydrogen cyanide and ammonia from gaseous mixtures of the same which comprises passing the said mixture in contact with an acidic aqueous solution of a boric acid-pentaerythritol complex whereby the ammonia reacts therewith and the cyanide is dissolved in the solution, stripping off the cyanide from the resulting solution at a temperature below that at which the ammonia reaction product dissociates and then heating the remaining liquid to a temperature which dissociates the reaction product yielding the ammonia.

9. A process for recovering separately hydrogen cyanide and ammonia from gaseous mixtures of the same which comprises intimately contacting the said mixture with an acidic aqueous solution of a boric acid-polyhydroxy alcohol complex whereby the ammonia reacts therewith and the cyanide is dissolved in the solution, stripping off the cyanide from the resulting solution at a temperature below that at which the ammonia reaction product dissociates and then heating the remaining solution to a temperature of boiling at atmospheric pressure, whereby the reaction product dissociates yielding the ammonia.

10. A process for recovering separately hydrogen cyanide and ammonia from gaseous mixtures of the same which comprises intimately contacting the said mixture with an acidic aqueous solution of a boric acid-polyhydroxy alcohol complex whereby the ammonia reacts therewith and the cyanide is dissolved in the solution, stripping off the cyanide from the resulting solution by heating the same to boiling under reduced pressure, the temperature being below that at which the ammonia reaction product dissociates and then heating the remaining solution to a temperature of boiling at atmospheric pressure whereby the reaction product dissociates yielding the ammonia.

11. A process for removing the hydrogen cyanide content from gaseous mixtures containing the same which comprises, flowing said mixture in intimate contact with an aqueous solution of an acidic boric acid-polyhydroxy organic complex and taking up the hydrogen cyanide in said solution from said gaseous mixture.

GEORGE BARSKY.

REFERENCES CITED

The following references are of record in the file of this patent:

UNITED STATES PATENTS

| Number | Name | Date |
|---|---|---|
| 1,964,808 | Bottoms | July 3, 1934 |
| 2,106,446 | Baehr et al. | Jan. 25, 1938 |
| 2,161,663 | Baehr et al. | June 6, 1939 |

OTHER REFERENCES

Karrer, Organic Chemistry, 2nd English edition, revised and enlarged, Elsevier Pub. Co., N. Y., 1946, pages 108, 109.